(No Model.) 2 Sheets—Sheet 1.
C. E. HILL.
MUSIC CHART.
No. 373,069. Patented Nov. 15, 1887.
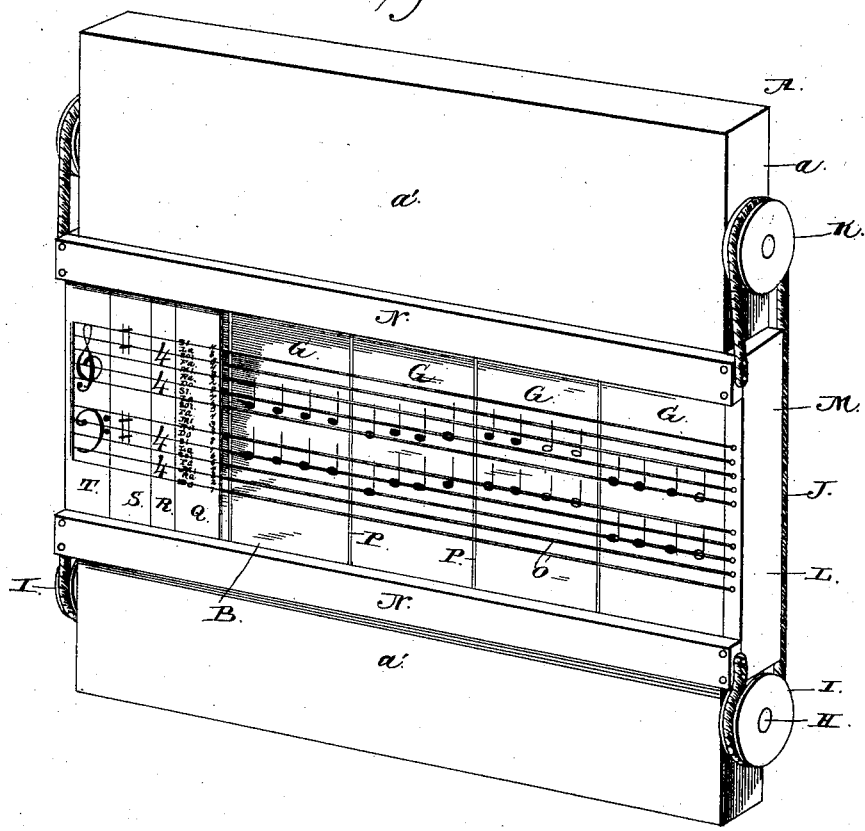
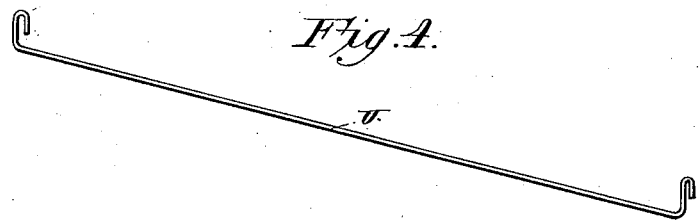
Witnesses
Inventor
Charles E. Hill
by C. A. Snow & Co.
his Attorneys

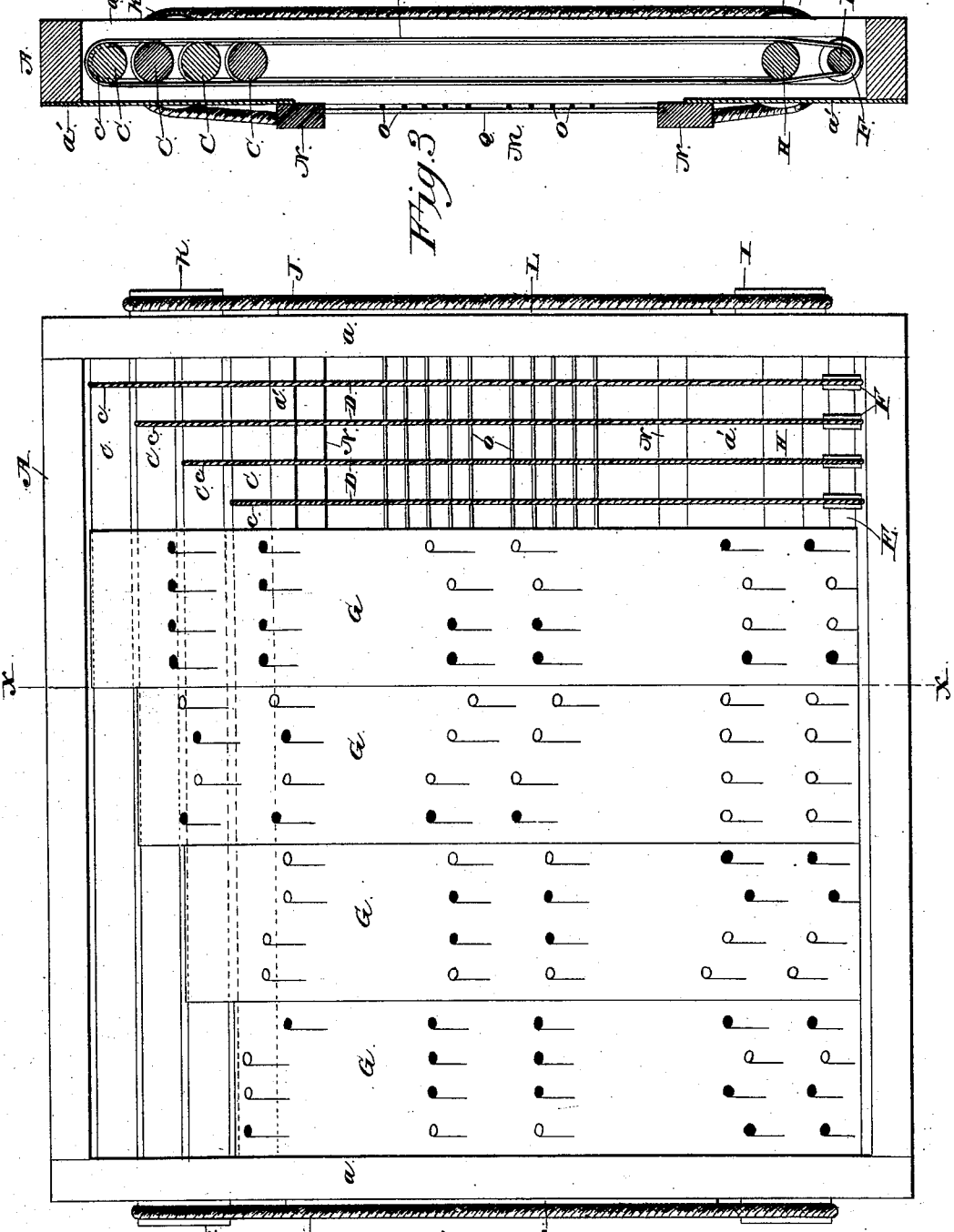

UNITED STATES PATENT OFFICE.

CHARLES EDMUND HILL, OF BIEBER, CALIFORNIA.

MUSIC-CHART.

SPECIFICATION forming part of Letters Patent No. 373,059, dated November 15, 1887.

Application filed August 30, 1887. Serial No. 248,292. (No model.)

*To all whom it may concern:*

Be it known that I, CHARLES EDMUND HILL, a citizen of the United States, residing at Bieber, in the county of Lassen and State of California, have invented a new and useful Improvement in Music-Charts, of which the following is a specification.

My invention relates to improvements in indicator-charts for teaching vocal music; and it consists in certain novel features, hereinafter first fully described, and then pointed out in the claims.

In the accompanying drawings, Figure 1 is a perspective view of my improved device. Fig. 2 is a rear elevation of the same. Fig. 3 is a vertical cross-section of the same, and Fig. 4 is a detail view showing the device for indicating leger-lines.

Referring to the drawings by letter, A designates an inclosing frame or case composed of the side bars, a, united at their ends in any desired manner, and having the coverings a' upon their front edges, which extend across the frame from side to side and leave an open space, B, across the central portion of the frame between their opposing edges.

In the upper portion of the frame I provide a series of rollers, C, which are journaled in the side bars of the frame, and are provided near one end with annular grooves c, in which the operating-cords D are fitted. A cylindrical rod, E, is secured rigidly in the lower portion of the frame, and a series of pulleys, F, corresponding in number to the number of the rollers C, is mounted on the said rod. The operating-cords pass over these pulleys, one cord passing over each pulley, as clearly shown.

G G designate belts formed of canvas or other suitable material and passing around the rod D and the rollers C, one belt passing around each roller. These belts have musical notes printed, painted, or otherwise formed upon them, as shown, the notes being arranged in a series of two rows and the notes of the rows being arranged in various positions, so as to produce a variety of exercises when the device is manipulated.

H designates a roller or shaft which is journaled in the side bars of the frame, near the lower ends of the same. The ends of this bar project from the opposite sides of the frame, and grooved pulleys I are secured thereto. Cords J pass over these pulleys I and similar pulleys, K, on the sides of the frame, near the upper ends of the same, and have their ends secured to a sliding frame, L, which is adjusted by said cords to different positions over the open space B. This frame L is composed of a pair of side bars, M, which lie against the side bars of the main or inclosing frame, and the cross-bars N, connecting the same to hold them firm in their position. Across the frame L, I stretch ten cords, O, which have their opposite ends secured to the side bars, M, and arranged in two parallel series of five cords each, to represent the bass and treble staffs.

P P designate a series of vertical cords which are detachably secured to the cross-bars N and extend across the staffs to indicate the bars.

Q R S T designate a series of cards which are secured or hung upon the upper cross-bar N and extend across the staffs at the left-hand end of the same. The card Q has printed upon it the numeral and syllable names of the scale, and is to be adjusted to the device so as to indicate the degree of the staff upon which each syllable is written in the key being taught. The card T has represented upon it the signs of the bass and treble clefs. The card S indicates the key by displaying the sharps or flats comprising its signature, and the card R displays the fractions indicating the time in which the exercise is to be sung.

U is a wire having its ends bent up and provided with hooks. This wire is used to designate the added or leger lines, and is secured in position by having its hooks engage the lower line of the staff, the cross-bars, or the belts, as will be readily understood. Slurs and ties may be readily formed in the same manner by giving the main portion of the wire a slight curved shape.

In practice the notes upon the endless belts are displayed through the open space B and the staffs adjusted so that the correct position will be indicated by the lines and spaces, and it is thought the manner of using the device will be readily understood.

It will be observed that the device is very simple, and that a vast number of exercises may be taught from it. The belts may be shifted either singly or all together to change the exercise. The same exercise may be instantly changed to another key by shifting the sliding frame and changing the signature-card.

The time-indicating card may be changed and the cords P readily shifted to indicate the difference in the measures.

Having thus described my invention, what I claim, and desire to secure by Letters Patent, is—

1. The combination of the case having a central display-space, a series of endless belts mounted within the case, having musical notes formed upon them and traveling across the display-space, and a sliding frame mounted on the case and carrying a series of cords, said cords being arranged at right angles to the endless belts to represent the musical staff, substantially as set forth.

2. In a music-indicator, a wire having its ends bent up and provided with hooks to be secured to the indicator to represent leger-lines or ties and slurs.

In testimony that I claim the foregoing as my own I have hereto affixed my signature in presence of two witnesses.

CHARLES EDMUND HILL.

Witnesses:
GEO. H. KNIGHT,
G. LAPOINT.